United States Patent
Mosterman et al.

(10) Patent No.: US 7,181,374 B1
(45) Date of Patent: Feb. 20, 2007

(54) QUALITATIVE DIAGNOSIS SYSTEM AND METHOD

(75) Inventors: Pieter J. Mosterman, Framingham, MA (US); Eric J. Manders, Nashville, TN (US); Gautam Biswas, Brentwood, TN (US)

(73) Assignee: Vanderbilt University, Nashville, TN (US)

( * ) Notice: Subject to any disclaimer, the term of this patent is extended or adjusted under 35 U.S.C. 154(b) by 672 days.

(21) Appl. No.: 10/161,096

(22) Filed: May 31, 2002

Related U.S. Application Data

(60) Provisional application No. 60/294,967, filed on May 31, 2001.

(51) Int. Cl.
- G01R 15/00 (2006.01)
- G06F 19/00 (2006.01)
- G06F 17/50 (2006.01)
- G05B 15/00 (2006.01)
- G05B 11/01 (2006.01)
- G06G 7/48 (2006.01)

(52) U.S. Cl. .................. 703/2; 703/6; 703/7; 703/8; 700/1; 700/11; 702/57; 702/64; 702/65

(58) Field of Classification Search .............. 703/2, 703/13, 21; 700/11, 19
See application file for complete search history.

(56) References Cited

OTHER PUBLICATIONS

DBLP Bibliography Server—Pieter J. Mosterman. http://www.informatik.uni-trier.de/~ley/db/indicies/a-tree/m/Mosterman:Pieter_J=.html Printed on Sep. 2, 2005.*

Mosterman, P.J. and G. Biswas. "Towards Procedures for Systematically Deriving Hybrid Models of Complex Systems." Hybrid Systems: Computation and Control, 3rd Int'l Workshop (HSCC 2000). Mar. 23-25, 2000.*

DBLP Bibliography Server—Hybrid Systems: Computation and Control, 3rd Int'l Workshop (HSCC 2000). Mar. 23-25, 2000. http://www.informatik.uni-trier.de/~ley/db/conf/hybrid/hscc2000.html.*

Manders, E.J., P.J. Mosterman, G. Biswas and L. Barford. "TRANSCEND: A System for Robust Monitoring and Diagnosis of Complex Engineering Systems." Jan. 14, 1999. http://www.hpl.hp.com/techreports/1999/HPL-1999.37.ps.*

Manders, E.J., G. Biswas, P.J. Mosterman and R.J. Barnett. "Signal Interpretation for Monitoring and Diagnosis, A Cooling System Testbed." IEEE Transactions on Instrumentation and Measurement. vol. 49, No. 3, Jun. 2000, pp. 503-508.*

Manders, E.J., G. Biswas, P.J. Mosterman, L. Barford, V. Ram, and R.J. Barnett. "Signal Interpretation for Monitoring and Diagnosis, A Cooling System Testbed." Proc. of the 16th IEEE Instrumentation and Measurement Technology Conf. May 24-26, 1999, vol.*

(Continued)

*Primary Examiner*—Paul Rodriguez
*Assistant Examiner*—Ayal Sharon
(74) *Attorney, Agent, or Firm*—Waddey & Patterson; Mark J. Patterson

(57) ABSTRACT

A system and method for predicting the behavior of a complex physical system with a qualitative analysis by correctly handling algebraic loops in physical system models for diagnosis applications. This approach recognizes the presence of negative feedback effects in loop structures and analyses these effects by tracking the entry point into the algebraic loop to resolve conflicting predictions.

13 Claims, 14 Drawing Sheets

Temporal causal graph for the engine cooling system. Vertices that correspond to measured variables are circled.

OTHER PUBLICATIONS

Mosterman, P.J. "Diagnosis of Physical Systems with Hybrid Models Using Parametrized Causality." Hybrid Systems: Computation and Control, 4th Int'l Workshop (HSCC 2001). Mar. 28-30, 2001. Lecture Notes in Computer Science 2034 Springer 2001. pp. 447-450.*

G. Biswas. "TRANSCEND: Diagnosis of Continuous Dynamic Systems from Transients." Bridge Workshop, Mar. 2001. http://www.di.unito.it/~dx01/bridge_material/biswas.pdf.*

Mosterman, P.J. and G. Biswas. "Diagnosis of Continuous Valued Systems in Transient Operating Regions." IEEE Transactions on Systems, Man, and Cybernetics—Part A. vol. 29, No. 6, Nov. 1999.*

Mosterman, P. et al. "Qualitative Dlagnosis of Systems With Models That Include a Class of Algebraic Loops." Mar. 17, 2000. http://moncs.cs.mcgill.ca/people/mosterman/patents/alp/p.pdf.*

Mosterman, P. "4 The Temporal Causal Graph." Jul. 15, 1997. http://msdl.cs.mcgill.ca/people/ mosterman/papers/lipn97/node11.html.*

IEEE Transactions on Instrumentation and Measurement. vol. 49, No. 3., Jun. 2000, pp. 503-508, "Signal Interpretation for Monitoring and Diagnosis, A Cooling System Testbed".

"A Java Implementation of an Environment for Hybrid Modeling and Simulation of Physical Systems" Pieter J. Mosterman and Gautam Biswas. ICBGM '99, pp. 157-162. Jan. 1999.

"Hybrid Modeling and Verification of Embedded Control Systems" Pieter J. Mosterman, Gautam Biswas and Janos Sztipanovits. Proc. 7th IFAC CALSO '97. pp. 21-26. Apr. 28-30, 1997.

"Monitoring, Prediction, and Fault Isolation in Dynamic Physical Systems" Pieter J. Mosterman and Gautam Biswas. Proc. of AAAI-97, pp. 100-105. Jul. 1997.

"A Systematic Analysis of Measurement Selection Algorithms for Fault Isolation in Dynamic Systems" Sriram Narasimhan, Pieter J. Mosterman and Gautam Biswas. Proc. Int'l Workshop on Diagnosis Principles. Jun. 1998.

"Measurement Selection and Diagnosability of Complex Physical Systems" Pieter J. Mosterman, Gautam Biswas and Sriram Narasimhan, Eighth Int'l Workshop on Principles of Diagnosis. Sep. 1997.

"Qualitative Bond Graph Reasoning in Control Engineering—Part I: Qualitative Bond Graph Modelling and Controller Design" D.A. Linkens and H. Wang. ICBGM '95. pp. 183-188. Jan. 1995.

"Qualitative Bond Graph Reasoning In Control Engineering—Part II: Fault Diagnosis" D.A. Linkens and H. Wang. IGBGM '95. pp. 189-194. Jan. 1995.

"Monitoring of Systems Modelled by Bond-Graphs" M. Tagina, JP. Cassar, G. Dauphin-Tanguy, and M. Staroswiecki, ICBGM '95. pp. 275-282. Jan. 1995.

"Qualitative Dynamic Behavior of Physical System Models with Algebraic Loops" Peter J. Mosterman, Eric-J. Manders and Gautam Biswas. Eleventh Int'l Workshop on Principles of Diagnosis. Jun. 2000.

"Hybrid Dynamic Systems: A Hybrid Bond Graph Modeling Paradigm and Its Application in Diagnosis" Pieter J. Mosterman, 1997 Dissertation, Vanderbilt University, May 1997.

* cited by examiner

Figure 4: Temporal causal graph for the engine cooling system. Vertices that correspond to measured variables are circled.

Figure 5: Chevrolet V8 engine with sensors. The fan is on the bottom left, the carburetor on the top right (the air cleaner has been removed).

| | | |
|---|---|---|
| $C_{hy-blk}-$ | s17: | · · · |
| | e6: | · · · |
| | e30: | 0 · · |
| | e47: | 0 0 · |
| $g_f-$ | s17: | · · · |
| | e6: | · · · |
| | e30: | 0 · · |
| | e47: | 0 0 · |
| $m_1+$ | s17: | · · · |
| | e6: | · · · |
| | e30: | 0 · · |
| | e47: | 0 0 · |
| $R_{leak}-$ | s17: | · · · |
| | e6: | · · · |
| | e30: | 0 · · |
| | e47: | 0 0 · |
| $I_{rad-out}+$ | s17: | · · · |
| | e6: | · · · |
| | e30: | 0 · · |
| | e47: | 0 · · |
| $I_{tstat}+$ | s17: | 0 · · |
| | e6: | 0 · · |
| | e30: | 0 · · |
| | e47: | 0 · · |
| $R_{l-hose}+$ | s17: | 0 · · |
| | e6: | 0 · · |
| | e30: | 0 0 · |
| | e47: | 0 0 · |
| $C_{hy-rad}+$ | s17: | 0 · · |
| | e6: | 0 · · |
| | e30: | 0 0 · |
| | e47: | 0 0 · |
| $R_{tstat}+$ | s17: | 0 0 · |
| | e6: | 0 0 · |
| | e30: | 0 0 · |
| | e47: | 0 0 · |
| $R_{hy-blk}-$ | s17: | · · · |
| | e6: | · · · |
| | e30: | 0 · · |
| | e47: | 0 0 · |
| $g_f+$ | s17: | · · · |
| | e6: | · · · |
| | e30: | 0 · · |
| | e47: | 0 0 · |
| $m_1-$ | s17: | · · · |
| | e6: | · · · |
| | e30: | 0 · · |
| | e47: | 0 0 · |
| $C_{hy-blk}+$ | s17: | · · · |
| | e6: | · · · |
| | e30: | 0 · · |
| | e47: | 0 0 · |
| $I_{tstat}-$ | s17: | 0 · · |
| | e6: | 0 · · |
| | e30: | 0 · · |
| | e47: | 0 · · |
| $R_{tstat}-$ | s17: | 0 0 · |
| | e6: | 0 0 · |
| | e30: | 0 0 · |
| | e47: | 0 0 · |

Fig. 6

| step 0 | actual | $e_1$: | + |
|---|---|---|---|
| $C_1-$ | $e_1$: | + | |
| $R_1+$ | $e_1$: | 0 | |
| $R_2+$ | $e_1$: | 0 | |
| $I_1-$ | $e_1$: | 0 | |

(a) Normal algorithm.

| step 0 | actual | $e_1$: | + |
|---|---|---|---|
| $C_1-$ | $e_1$: | +− | |
| $R_1+$ | $e_1$: | 0+ | |
| $R_2+$ | $e_1$: | 0+ | |
| $I_1-$ | $e_1$: | 0 | |

(b) Enhanced algorithm

Fig. 11

| | |
|---|---|
| $C_{hy-blk}-$ | s17: − · ·<br>e6: + · ·<br>e30:0 + ·<br>e47:0 0 · |
| $g_f-$ | s17: − · ·<br>e6: + · ·<br>e30:0 + ·<br>e47:0 0 · |
| $m_1+$ | s17: − · ·<br>e6: + · ·<br>e30:0 + ·<br>e47:0 0 · |
| $R_{leak}-$ | s17: − · ·<br>e6: − · ·<br>e30:0 + ·<br>e47:0 0 · |
| $I_{rad-out}+$ | s17: − · ·<br>e6: − · ·<br>e30:0 · ·<br>e47:0 · · |
| $I_{tstat}+$ | s17:0 − ·<br>e6: 0 + ·<br>e30:0 · ·<br>e47:0 · · |
| $R_{l-hose}+$ | s17:0 − ·<br>e6: 0 − ·<br>e30:0 0 ·<br>e47:0 0 · |
| $C_{hy-rad}+$ | s17:0 − ·<br>e6: 0 − ·<br>e30:0 0 ·<br>e47:0 0 · |
| $R_{tstat}+$ | s17:0 0 −<br>e6: 0 0 +<br>e30:0 0 ·<br>e47:0 0 · |
| $R_{hy-blk}-$ | s17: − · ·<br>e6: − · ·<br>e30:0 − ·<br>e47:0 0 · |
| $g_f+$ | s17: + · ·<br>e6: − · ·<br>e30:0 − ·<br>e47:0 0 · |
| $m_1-$ | s17: + · ·<br>e6: − · ·<br>e30:0 − ·<br>e47:0 0 · |
| $C_{hy-blk}+$ | s17: + · ·<br>e6: − · ·<br>e30:0 − ·<br>e47:0 0 · |
| $I_{tstat}-$ | s17:0 + ·<br>e6: 0 − ·<br>e30:0 · ·<br>e47:0 · · |
| $R_{tstat}-$ | s17:0 0 +<br>e6: 0 0 −<br>e30:0 0 ·<br>e47:0 0 · |

Fig. 12

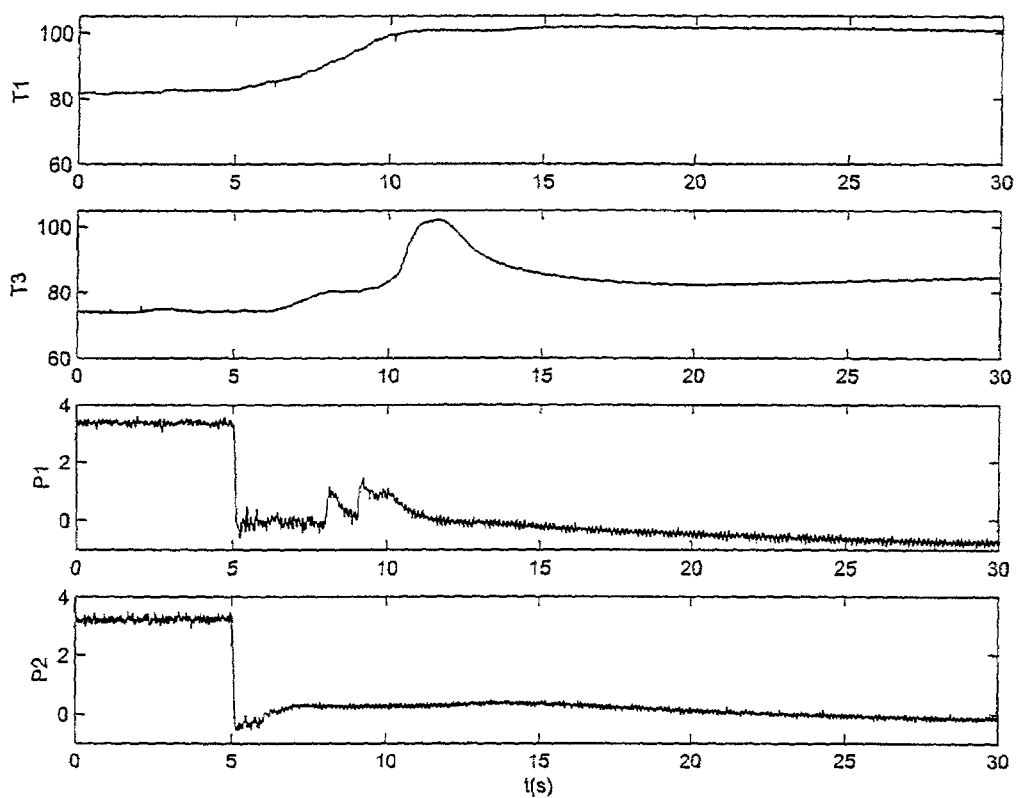
Figure 13: Measurements for a punctured lower hose fault ($R_{leak}-$)

| | step 0 | |
|---|---|---|
| | | actual |
| | s17: | − 0 |
| | e6: | − 0 |
| | e30: | 0 0 |
| | e47: | 0 0 |
| $C_{hy-blk}-$ | s17: | − · · |
| | e6: | + · · |
| | e30: | 0 + · |
| | e47: | 0 0 · |
| $g_f-$ | s17: | − · · |
| | e6: | + · · |
| | e30: | 0 + · |
| | e47: | 0 0 · |
| $m_1+$ | s17: | − · · |
| | e6: | + · · |
| | e30: | 0 + · |
| | e47: | 0 0 · |
| $R_{leak}-$ | s17: | − · · |
| | e6: | − · · |
| | e30: | 0 + · |
| | e47: | 0 0 · |
| $I_{rad-out}+$ | s17: | − · · |
| | e6: | − · · |
| | e30: | 0 · · |
| | e47: | 0 · · |
| $I_{tstat}+$ | s17: | 0 − · |
| | e6: | 0 + · |
| | e30: | 0 · · |
| | e47: | 0 · · |
| $R_{l-hose}+$ | s17: | 0 − · |
| | e6: | 0 − · |
| | e30: | 0 0 · |
| | e47: | 0 0 · |
| $C_{hy-rad}+$ | s17: | 0 − · |
| | e6: | 0 − · |
| | e30: | 0 0 · |
| | e47: | 0 0 · |
| $R_{tstat}+$ | s17: | 0 0 − |
| | e6: | 0 0 + |
| | e30: | 0 0 · |
| | e47: | 0 0 · |
| $R_{hy-blk}-$ | s17: | − · · |
| | e6: | − · · |
| | e30: | 0 − · |
| | e47: | 0 0 · |
| $g_f+$ | s17: | + · · |
| | e6: | − · · |
| | e30: | 0 − · |
| | e47: | 0 0 · |
| $m_1-$ | s17: | + · · |
| | e6: | − · · |
| | e30: | 0 − · |
| | e47: | 0 0 · |
| $C_{hy-blk}+$ | s17: | + · · |
| | e6: | − · · |
| | e30: | 0 − · |
| | e47: | 0 0 · |
| $I_{tstat}-$ | s17: | 0 + · |
| | e6: | 0 − · |
| | e30: | 0 · · |
| | e47: | 0 · · |
| $R_{tstat}-$ | s17: | 0 0 + |
| | e6: | 0 0 − |
| | e30: | 0 0 · |
| | e47: | 0 0 · |

| | step 1 | |
|---|---|---|
| | | actual |
| | s17: | − − |
| | e6: | − + |
| | e30: | + + |
| | e47: | + + |
| $R_{leak}-$ | s17: | − · · |
| | e6: | − · · |
| | e30: | 0 + · |
| | e47: | 0 0 · |
| $I_{rad-out}+$ | s17: | − · · |
| | e6: | − · · |
| | e30: | 0 · · |
| | e47: | 0 · · |
| $R_{hy-blk}-$ | s17: | − · · |
| | e6: | − · · |
| | e30: | 0 − · |
| | e47: | 0 0 · |

| | step 2 | |
|---|---|---|
| | | actual |
| | s17: | − − |
| | e6: | − 0 |
| | e30: | + + |
| | e47: | + + |
| $R_{leak}-$ | s17: | − · · |
| | e6: | − · · |
| | e30: | 0 + · |
| | e47: | 0 0 · |
| $I_{rad-out}+$ | s17: | − · · |
| | e6: | − · · |
| | e30: | 0 · · |
| | e47: | 0 · · |

Figure 14: Fault detection and isolation for a punctured lower hose fault ($R_{leak}-$).

QUALITATIVE DIAGNOSIS SYSTEM AND METHOD

This application claims benefit of co-pending U.S. Patent Application Ser. No. 60/294,967 filed May 31, 2001, entitled "A Qualitative Diagnosis of Systems with Models that Includes a Class of Algebraic Loops" which is hereby incorporated by reference.

A portion of the disclosure of this patent document contains material that is subject to copyright protection. The copyright owner has no objection to the facsimile reproduction by anyone of the patent document or the patent disclosure, as it appears in the Patent and Trademark office patent file or records, but otherwise reserves all copyright rights whatsoever.

BACKGROUND OF THE INVENTION

The present invention relates generally to predicting the behavior of a complex physical system with a qualitative analysis. More particularly, this invention pertains to improving the resolution of the prediction by correctly handling algebraic loops in physical system models for diagnosis applications. The prior art has recognized the ability to analyze and track the dynamic behavior of complex physical systems with abstracted simplified models in a qualitative reasoning framework. Typically the abstraction process creates lumped parameter models, which makes it hard to draw cause effect relation between individual component parameter changes and observed transients in the measurements. Our approach provides a more informative analysis by recognizing the presence of negative feedback effects in loop structures.

The Modeling and Analysis of Complex Systems group at Vanderbilt University School of Engineering, conducts research in the area of hybrid modeling and analysis of physical systems as well as monitoring, prediction and fault isolation (diagnosis) for dynamic continuous systems. A primary focus of the current research in this area is in developing hybrid models for analyzing mixed continuous and discrete behavior of engineering systems. Mixed behaviors are inherent in embedded systems, i.e., continuous processes controlled by discrete elements, such as PLCs (programmable logic arrays) and computers. Also, discontinuities may emerge in models of continuous physical systems as an artifact of abstracting physical phenomena that operate on a temporal or spatial scale much smaller than that of interest to the modeller. In this case, physical laws such as continuity of power and conservation of energy appear to be violated when discontinuities occur. Much of the research has been geared towards finding physical laws that govern the resulting discrete behavior.

Nonlinear behaviors of real-world physical systems are often abstracted into piecewise linear models by simplifying component parameters (parameter abstraction) or coarsening the time scale of behavior analysis (time scale abstraction). These two abstraction types correspond to two distinctly different discrete event iteration mechanisms that are active in between continuous modes. An important result of this research is an ontology of phase space transitions types in hybrid physical system models.

The research has developed a hybrid bond graph modeling paradigm that combines energy based bond graph models with finite state automata for discrete meta-level control of model configuration changes. This provides a systematic framework for behavior generation based on the physical principles of conservation of state and invariance of state. The principle of divergence of time verifies consistency of models using phase space analysis.

Current research is focused on the development of compositional modeling techniques and robust qualitative/quantitative simulators based on these principles, and the application of this approach for control, prediction, monitoring, and diagnosis of complex embedded processes.

In the area of Monitoring, Prediction and Fault Isolation, research has focused on the development of schemes for monitoring, prediction, and diagnosis of complex dynamic continuous systems. Earlier work applied diagnosis based on steady state models. Recent work has focused on monitoring and diagnosis from transient behaviors as faults occur in a system.

Diagnosis from dynamic transient behaviors is complex and requires close interaction of three modules: (i) monitoring, (ii) generation and refinement of fault hypotheses, and (iii) prediction. The research has established an architecture for model-based diagnosis of continuous systems that combines dynamic system models with the three integrated modules. Our initial modeling work starts from bond graphs and derives a temporal causal graph of dynamic system behavior. This underlying system model is used to identify system faults from deviating measurements and predict future behavior of the observed variables in terms of fault signatures which are expressed as parameter deviations and their magnitude and higher order derivatives. Behavior and diagnostic analysis is performed in a qualitative reasoning framework. The prediction module computes dynamic effects as a result of a fault in terms of qualitative magnitude changes and higher order derivative effects. A comparison of the monitored values with the predicted effects helps to refine initial candidate sets.

The current focus of the research is on studying a number of monitoring schemes that facilitate fault identification, progressive monitoring to facilitate discrepancy detection and refinement of fault candidates, and combining the use of qualitative and quantitative information to improve diagnostic accuracy. Future work will involve dealing with structural faults in the system, and multiple fault diagnosis.

With proliferation in embedded systems and their applications, this methodology takes on more and more significance. There are strong demands for real-time and online monitoring, fault isolation, and control of complex physical systems for safety reasons and performance issues. The computational burden imposed by real time online requirements necessitates the use of simplified models for analysis. As previously noted, this simplified models often produce lumped parameter representations that make it hard to establish cause effect relations between individual component parameters and observed transients in the system measurements. The present methodology provides a systematic approach to generating more informed predictions with simplified models that often result in the algebraic loops with negative feedback effects. The present application is directed to a solution for handling these negative feedback effects.

SUMMARY OF THE INVENTION

The present invention pertains to improving the resolution of qualitative prediction by correctly handling algebraic loops in physical system models for diagnosis applications. The present approach provides a more informative analysis by recognizing the presence of negative feedback effects in loop structures.

A basis of the present invention is found in a method to break algebraic loops with negative gain in linear systems of the form $$\begin{cases} \dot{x} = A_d(t)x(t) + A_a(t)z(t) \\ z = B_d(t)x(t) + B_a(t)z(t) \end{cases}$$

to provide an enhanced predicted value from an initial predicted value. The method includes the actions of marking the entry point into the system of algebraic equations embodied by Bd and Ba to create a marked entry point, using the algebraic loop to generate predicted deviations, and screening the predicted deviations using the marked entry point to identify valid deviations that may be used to enhance the initial predicted value to form the enhanced predicted value. These linear systems may have explicit input behavior described by the equations $$\begin{cases} \dot{x} = A_d x + A_a z + Cu \\ z = B_d x + B_a z + Du \end{cases}.$$

Furthermore, this method may be used to create an enhanced predicted value as a qualitative behavior value such as below nominal behavior, at nominal behavior, and above nominal behavior.

The present invention further encompasses a method for predicting a deviation effect caused by an initial deviation in a temporal causal graph model having a plurality of vertex and at least one algebraic loop. This method includes propagating the initial deviation through at least a portion of the plurality of vertex of the temporal causal graph model to establish a predicted deviation for a successive vertex and then associating a loop entry value with each predicted deviation after entry to the at least one algebraic loop. This basis may then be used for screening the predicted deviation using the associated loop entry value. When integrating relations are encountered, this may be further enhanced by keeping a separate loop entry value for each successive order encountered. One method for handling is to use temporal edges representing these integrating relations in the temporal causal graph model and propagating across the temporal edge to a successive order to form a successive predicted deviation. This successive predicted deviation is then associated with a successive loop entry value. This allows for the tracking of new entry points for each of the different orders that are encountered in the propagation process. This method then continues by screening the successive predicted deviation for each successive order using the successive loop entry value. This process is repeated for each order until the propagation reaches a required predicted derivative order for the level of prediction necessary for the system being utilized.

A still further method for generating qualitative predictions based on a qualitative model with instantaneous negative feedback paths is provided. This method includes marking the edges of feedback paths as part of an algebraic loop, tracking the entry point into the algebraic loop, generating predicted behavior associated with the entry point, using the entry point to identify conflicting results to screen the predicted behavior for valid results, and using the valid results to establish the qualitative predictions. In this method, screening the predicted deviation using the associated loop entry value may include checking a second deviation and second associated loop entry value for a selected vertex against a first predicted deviation and first associated loop entry value for the selected vertex to identify conflicts. For this method, when the first predicted deviation is the initial deviation, the method provides for terminating propagation and retaining the first predicted deviation when the second deviation has an opposing value to the initial deviation and the second associated loop entry value matches the first associated loop entry value. If both of the values are not the initial value, then the method may be improved by terminating propagation and marking the predicted deviation as unknown when the second deviation has an opposing value to the first deviation and the second associated loop entry value does not match the first associated loop entry value.

Yet a further method is taught by a method of establishing a predicted future value by including the effect of negative loop structure feedback in a temporal causal graph representation of a system including a plurality of vertices in an algebraic loop. This method includes predicting an initial future value, establishing an initial order and a sufficient propagation order for root deviations, propagating time integral effects on each order from the initial order through the sufficient propagation order to establish adjustment variables, and refining the initial future value in accordance with the adjustment variables to establish the predicted future value. Establishing a sufficient propagation order includes selecting the lowest propagation order necessary to capture transients having a substantive impact on the accuracy of the representation. Propagating for this method includes establishing an entry point vertex; and examining a successor vertex for a valid feedback effect on the entry point vertex. The examining a successor vertex includes reviewing successor level derivates to establish successor derivative values when the successor level is in a feedback loop; checking the successor derivative values for conflicts based on the entry point vertex; modifying the successor level value in accordance with the derivative variable; and setting the adjustment successor level value.

BRIEF DESCRIPTION OF THE DRAWINGS

FIG. 6 is a signature generation for the engine model of FIG. 4.

FIG. 11 is a comparison of a normal algorithm prediction against the enhanced algorithm prediction using the present invention.

FIG. 12 is a list of potential candidates for a hose puncture in the cooling system model.

FIG. 13 are the measurements for a punctured lower hose fault in the cooling system.

FIG. 14 is the steps of the fault detection and isolation for a lower hose puncture in the cooling system model.

DESCRIPTION OF THE PREFERRED EMBODIMENTS

Figure 1:
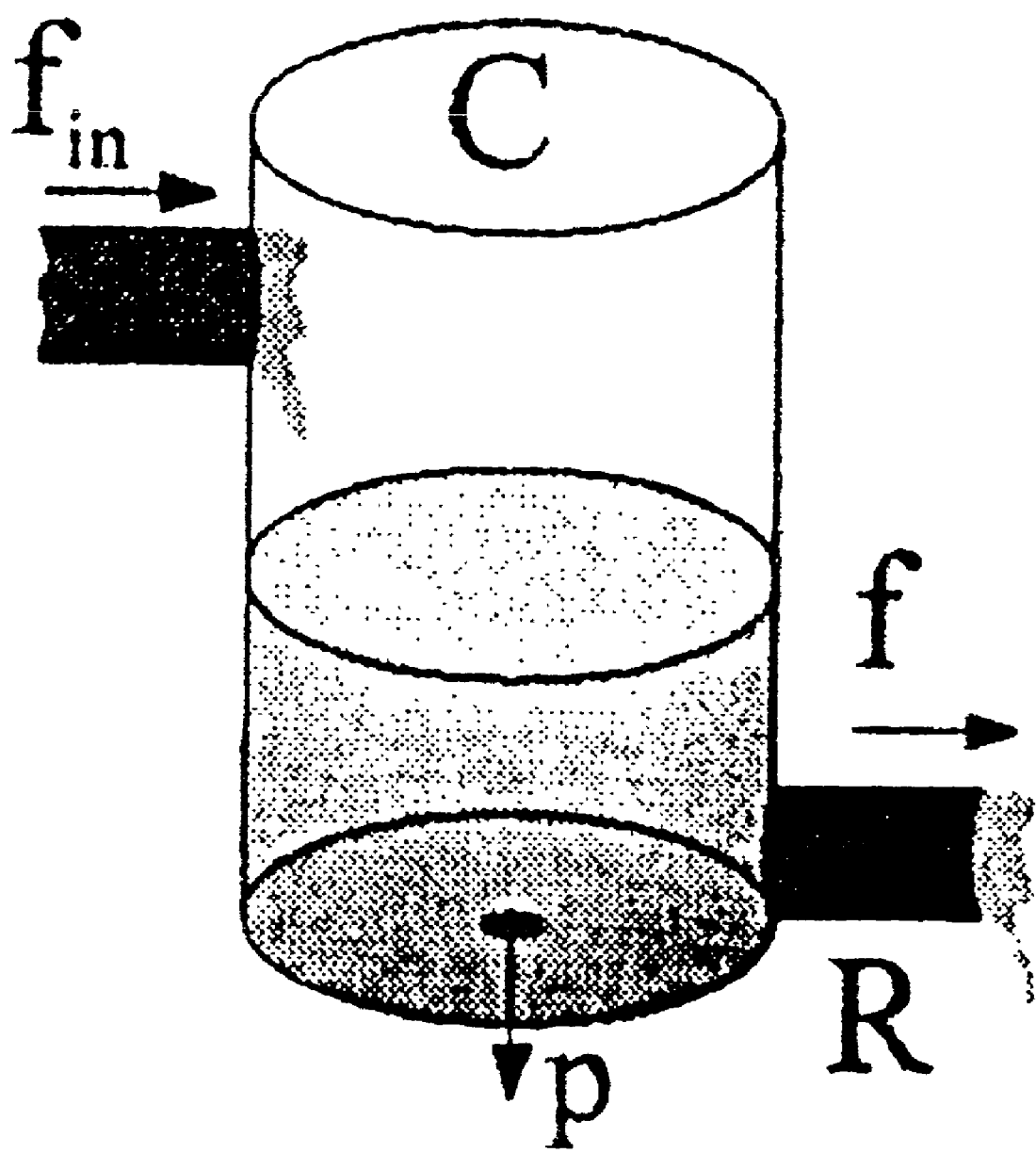
FIG. 1 is a schematic drawing of a tank with an inflow and an outflow.

The present invention is based on TRANSCEND (trademark), which is a system for monitoring and diagnosis of complex dynamic systems using qualitative transient analysis methods to overcome the difficulties that arise in numerical processing, especially for nonlinear systems. The future behavior of hypothesized faults is predicted in the form of signatures, and analyzed by a progressive monitoring scheme. Thus, this provides a model based diagnosis system for fault detection and isolation of abrupt faults in engineered systems such as fast breeder reactors and automobile engines. It applies models of dynamic system behavior to obtain accurate predictions for measured transients and compares predictions with actual observations to distill the true cause for the faulty behavior. To successfully perform diagnosis, this system needs a dynamic model of the system.

A critical task in designing the model for fault detection and isolation (FDI) is to determine the bandwidth of the measurement system, i.e., the fastest dynamic behavior still measured, and to include the corresponding time constants. The bandwith of transient signals that do not have a periodic component can be expressed in terms of the rise time of the signal. Dynamic behavior that is too fast to be observed by the measurements should not be included in the model as it leads to functional relations that cannot be observed, and, therefore, may lead to incorrect failure hypotheses.

This brings about a crucial issue in functional redundancy for FDI. Suppose the detailed system behavior can be captured by the system of equations, equation 1:

$$\begin{cases} \dot{x} = f(x, z, \epsilon, t) \\ \epsilon \dot{z} = g(x, z, \epsilon, t) \end{cases}$$

where $\epsilon$ is small, and, therefore, z captures fast dynamic behavior that may not be observable given the measurements. To achieve a suitable model for diagnosis, a singular perturbation, as described in Petar V. Kokotovic, Hassan K. Khalil, and John O'Reilly. *Singular Perturbation Methods in Control: Analysis and Design*. Academic Press, London, 1986. ISBN 0-12-417635-6, approach can be used to let $\epsilon \to 0$, which yields, equation 2:

$$\begin{cases} \dot{x} = f(x, z, 0, t) \\ 0 = g(x, z, 0, t) \end{cases}$$

or for sake of brevity, equation 3:

$$\begin{cases} \dot{x} = f(x, z, t) \\ 0 = g(x, z, t) \end{cases}$$

Here $\gamma$ is called the implicit part, or algebraic equations, and z are the algebraic variables. Continuous behaviors of the measurements determine the time constants of the model, and, therefore, which physical effects to include or not. For example, small inertial effects of a pipe often may not be visible with the given instrumentation system. To design a model that predicts behaviors in correspondence with this, these effects should not be modeled.

A straightforward approach would try to manipulate the implicit part in an explicit form, equation 4:

$$z = g_x(x, t)$$

and substitute this into the differential equation part, equation 5:

$$\dot{x} = f(x, g_x(x,t), t)$$

to arrive at the relation, equation 6:

$$\dot{x} = f_x(x, t)$$

The apparent disadvantage of this is that the function $f_x$ is not a direct map of the initially derived model, $\langle f, g \rangle$ anymore, and, therefore, often contains aggregate parameters, i.e., parameters that are part of more than one physical component in the system under diagnosis. In an FDI framework this is undesirable because one deviating parameter still implicates a number of physical components and the model does not contain further functional redundancy information to distinguish between the components. This redundancy has been removed by algebraic manipulations. It would be advantageous to handle the implicit equations directly, resulting in more discriminating information on a component level. To achieve optimal FDI results, it is therefore more appropriate to utilize the functional relations in the implicit equations. However, this results in a more complex model and standard qualitative methods fail.

The state of the art is illustrated by TRANSCEND (trademark) which will be used both to illustrate state of the art in qualitative parameter estimation of dynamic systems and serve as the preferred embodiment. It requires a diagnosis model that captures qualitative dependency relations between component parameters and the observed variables in the form of a temporal causal graph (TCG) to predict faulty behavior. Predictions are symbols that represent (i) discontinuous changes, (ii) magnitude deviations, (iii) slope deviations, and (iv) steady state behavior. A progressive monitoring scheme compares actual observations against the predicted transients for each hypothesized fault. Only those faults whose predicted transients agree with the observations are retained. The goal is to continue monitoring till the true fault is isolated. A detailed description of the modeling scheme and diagnosis methodology with examples can be found in Pieter J. Mosterman and Gautam Biswas. A Java Implementation of an Environment for Hybrid Modeling and Simulation of Physical Systems. In *ICBGM99*, pages 157–162, San Francisco, January 1999; and as illustrated in Pieter J. Mosterman, Gautam Biswas, and Janos Sztipanovits. Hybrid modeling and verification embedded control systems. In *Proceedings of the ~h IF A C CA CSD '97 Symposium*, pages 21–26, Gent, Belgium, April 1997.

A critical part in this scheme is the model, the TCG, used to predict future behavior in case of faults. The TCG is a directed graph whose edges are in one to one correspondence with component parameters and qualitative algebraic relations based on component connectivity. Component parameter values and their temporal influences on system behavior are defined as attributes of the TCG edges. The TCG representation provides a rich and uniform framework for representing magnitude and temporal constraints among system variables. The hypothesis generation and prediction components of the fault isolation task are then developed as graph traversal algorithms. The relation between initial and end vertices along a path is the result of the combined edge attributes along the path.

The prediction algorithm employs the system model to compute the qualitative transient behavior of the observed variables under the individual fault hypotheses. A constraint is placed on the problem space by making the assumption that faults do not cause changes in system configuration, and the system model remains valid even after faults occur in the system. Transient behavior is expressed as a tuple of qualitative values for magnitude, $1^{st}$ order time-derivative and higher order effects. The qualitative values are similar to those of the measured values: above nominal ('+'), below nominal ('−'), at nominal ('0') and unknown ('.'). Unknown values are the result of opposite qualitative influences. The tuple is called the signature for the variable, as illustrated in Pieter J. Mosterman and Gautam Biswas. Monitoring, Prediction, and Fault Isolation in Dynamic Physical Systems. In *AAAI-97*, pages 100–105, Rhode Island, August 1997. AAAI Press, 445 Burgess Drive, Menlo Park, Calif., 94025, and as illustrated in Pieter J. Mosterman and Gautam Biswas. A Java Implementation of an Environment for Hybrid Modeling and Simulation of Physical Systems. In *ICBGM99*, pages 157–162, San Francisco, January 1999.

The algorithm propagates the effects of a hypothesized fault to establish a signature for all observations. Time integrating effects introduce temporal edges in which case the cause variable affects the derivative of the effect variable. In the TCG, these edges are marked with a dt attribute. Propagation of a deviation starts with a $0^{th}$ order effect, i.e., a magnitude change. When an integrating edge is traversed, the magnitude change becomes a $1^{st}$ order change, i.e., the first derivative of the affected quantity changes. Similarly, a first order change propagating across an integrating edge produces a second order change, and so on. The highest predicted derivative order required is a design consideration, as illustrated in Pieter J. Mosterman. *Hybrid Dynamic Systems: A hybrid bond graph modeling paradigm and its application in diagnosis*. PhD dissertation, Vanderbilt University, 1997.

To illustrate, consider the tank in FIG. 1. TRANSCEND (trademark) assigns measured (−, +) values to system variables to implicate parameters that are functionally related. For example, in case of a blocked pipe, its flow, f, is reduced, and given the functional relation, equation 7:

$$F = \frac{p}{R},$$

with p the pressure drop and R the pipe resistance, f correctly implicates $R^+$, i.e., a blockage. FIG. 1 illustrates a tank with in and outflow. If this pipe is connected to the tank as illustrated in FIG. 1, the pressure drop is the pressure at the bottom of the tank and this pressure changes depending on the flow. So, another relation is, equation 8:

$$\dot{p} = \frac{1}{C}(f_{in} - f)$$

where −f applies because the flow through the pipe comes out of the tank.

Now, when $f^-$ is measured and $R+$hypothesized, predictions for future behavior of f given $R^+$ are f− from Eq. (7) and given f− Eq. (8) predicts $p^+$. But, $p^+$ causes $f^{\dot{}0}$ as modeled by Eq. (7), and, therefore, there are conflicting predictions for f and the true future behavior cannot be determined. This is solved by including the temporal delay as introduced by the time derivative operator acting on p. Now, $f^-$ predicts p from Eq. (8), i.e., p will rise, and, consequently, $f^-$, i.e., f will be below nominal and rise.

This notion is formalized in the qualitative parameter estimation FDI theory based on using the TCG that captures functional relations (edges) between system variables (vertices) in terms of parameters and their temporal effect. The approach has been successfully applied as part of the TRANSCEND (Trademark) diagnosis engine to a number of controlled physical systems (e.g., a secondary sodium cooling loop, an automobile engine cooling system, and a three tank hydraulic system).

Figure 2:
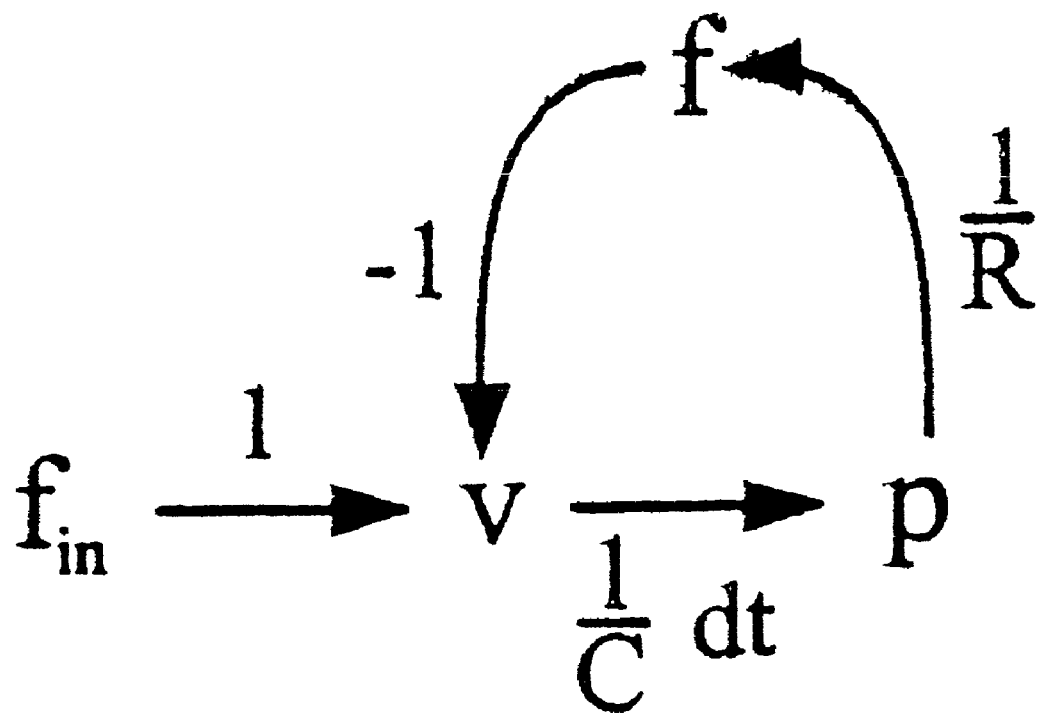
FIG. 2 is a temporal causal graph of the one-tank system of FIG. 1.

FIG. 2 shows a temporal causal graph of the one tank system. The TCG as shown in FIG. 2 corresponds to Eq. (7) and Eq. (8) and v is an additional variable introduced to represent the $f_{in}$−f summation in Eq. (8). When $R^+$ is a possible parameter deviation, given the measurements, a prediction of future behavior is generated by propagating this value throughout the graph. Because of the inverse relation, $R^+$ causes $f^-$, which causes $v^+$ and, taking the integrating relation 'dt' into account, $\dot{p}$, i.e., p is rising. Continuing the propagation results in $\dot{p}$ f+v $\dot{p}$, i.e., the second time derivative of p is negative. This propagation continues until variable behavior of the highest required order is predicted. Lower order behavior that has no assigned deviation is considered to be normal. In case of the one tank example, p has a first order behavior that is positive, and a second order behavior that is negative, however, no deviation for the zero order behavior is assigned and, therefore, considered normal. This is written as $p^{0+-}$, where the subscripts indicate increasing order of behavior.

The basic problem is that modeling for diagnosis requires the construction of a parsimonious model that captures all phenomena that are important to distinguish the different faults in the system. However, the model must not include phenomena that cannot be observed with the available instrumentation. To isolate faults accurately, the system needs to model nominal behavior as well as transients that occur after a fault manifests. This requires that the model captures the system dynamics quite precisely, even in the presence of faults. This is illustrated in a cooling system analysis.

Figure 3:
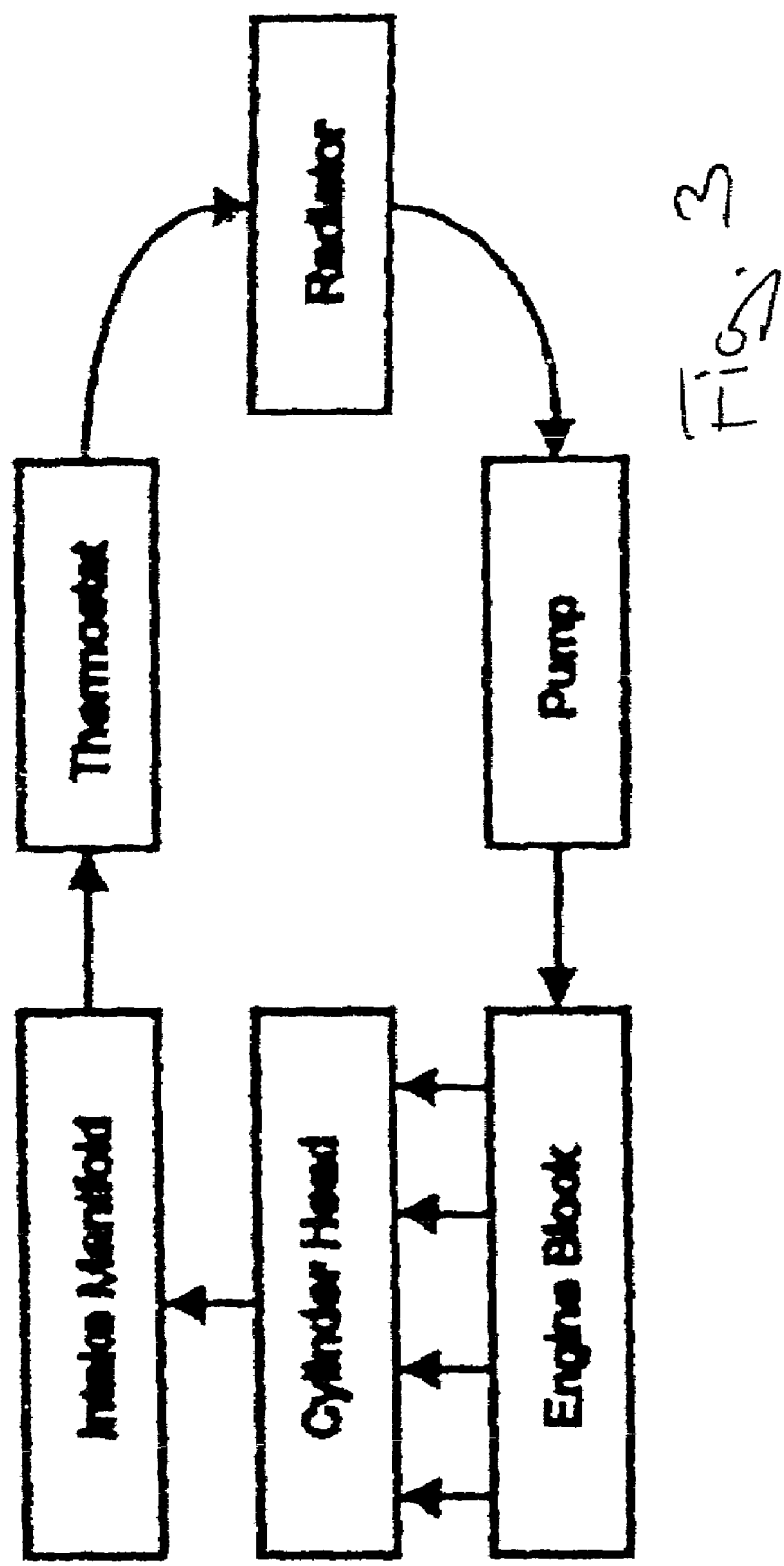
FIG. 3 is a block diagram of an engine cooling system.

An automotive cooling system uses a liquid coolant pumped through passageway in the engine block by a centrifugal pump driven by the crank axis. FIG. 3 shows a block diagram of the fluid path. Starting at the pump, coolant is pumped into the lower part of the engine block. The coolant passes through the block and through passageway in the cylinder, and heads up to the intake manifold from where it flows back towards the front of the engine. A thermostat regulates the flow of coolant at this point. Before the engine reaches its desired temperature the thermostat is closed and the coolant is pumped back into the engine block without passing through the radiator. When the engine reaches its desired temperature, the thermostat opens and the coolant now circulates through a hose to the radiator. The radiator acts as a heat exchanger and air blown through the radiator by a fan and/or motion of the vehicle cools the coolant. Controlling the flow of coolant in this manner ensures that the engine reaches normal operating temperature as quickly as possible. Details of the data acquisition system and signal processing techniques are presented elsewhere, as illustrated in Eric-Jan Manders, Gautam Biswas, Pieter J. Mosterman, Lee A. Barford, and Joel Barnett. Signal interpretation for monitoring and diagnosis, a cooling system test bed. *IEEE Transactions on Instrumentation and Measurement,* 2000.

Figure 4:
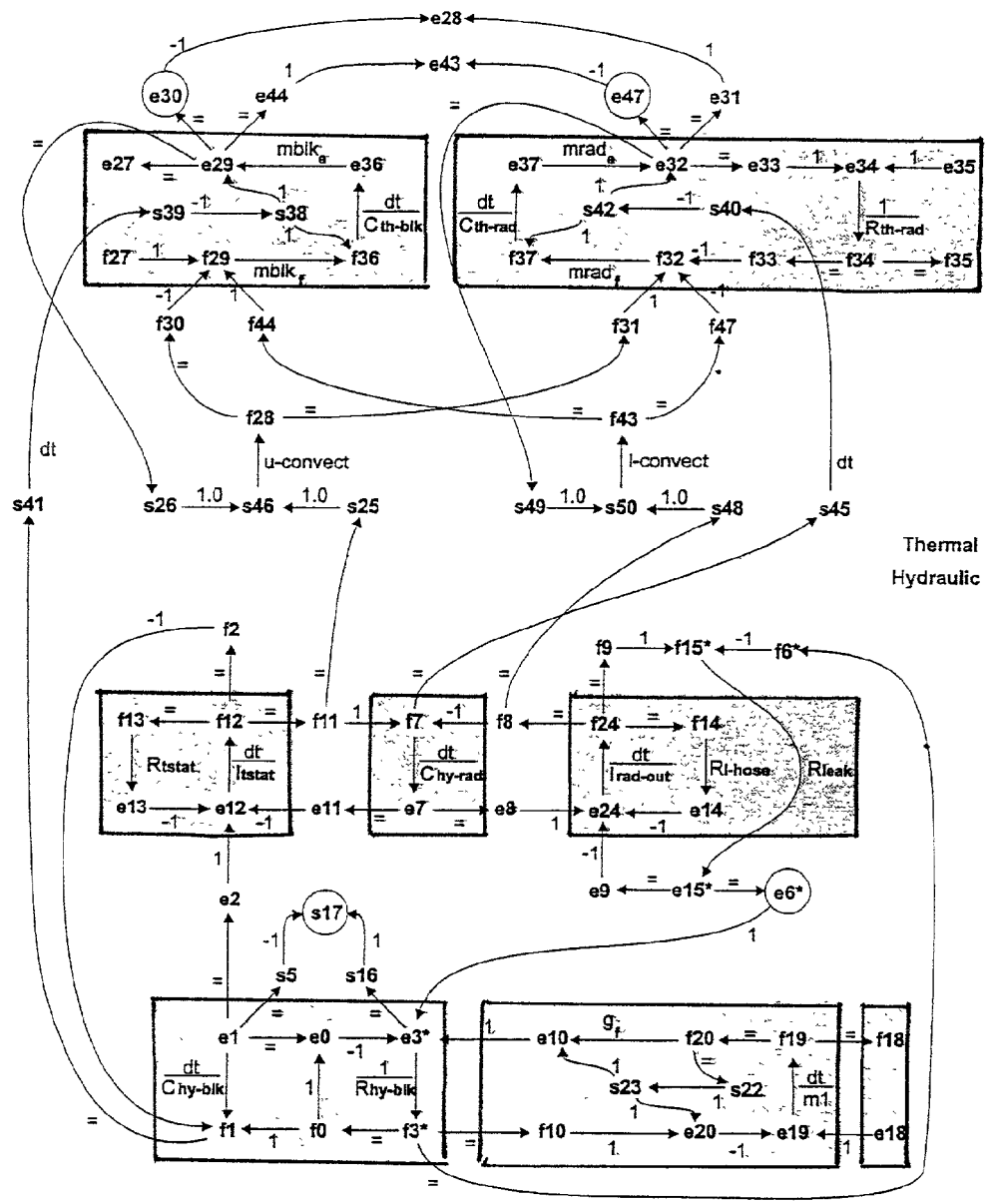
FIG. 4 is a temporal causal graph of the engine cooling system of FIG. 3.

FIG. 4 shows a temporal causal graph for the engine cooling system. Vertices that correspond to measured variables are circled. The hydraulic part is shown at the bottom and physical components are marked by blocked areas. The TCG is automatically derived from a bond graph model by tracing the causal strokes using the hybrid bond graph modeling and simulation tool HYBRSIM, (trademark) as illustrated in Pieter J. Mosterman and Gautam Biswas. A Java Implementation of an Environment for Hybrid Modeling and Simulation of Physical Systems. In *ICBGM99*, pages 157–162, San Francisco, January 1999. For example, the pressure in the radiator as generated by $C_{hy\text{-}rad}$, $e_7$, establishes a pressure drop across the radiator outlet, $I_{rad\text{-}out}$. This pressure drop, $e_{24}$, is determined by the radiator pressure minus the pressure drop across the lower hose, $e_{14}$, plus the pressure at the other end of the hose, $e_{e9}$, i.e., $e_{24}=e_8-e_g-e_{14}$. This is shown in the TCG as a vertex $e_{24}$ that is directly affected by $e_8$, but inversely related to $e_g$ and $e_{24}$. The pressure across $I_{rad\text{-}out}$ generates a flow of coolant out of the radiator, $f_8$, and combined with the positive flow of liquid into the radiator at the top, $f_{11}$, this yields a net flow of coolant into $C_{hy\text{-}rad}$ of $f_7=f_{11}-f_8$.

Figure 5:
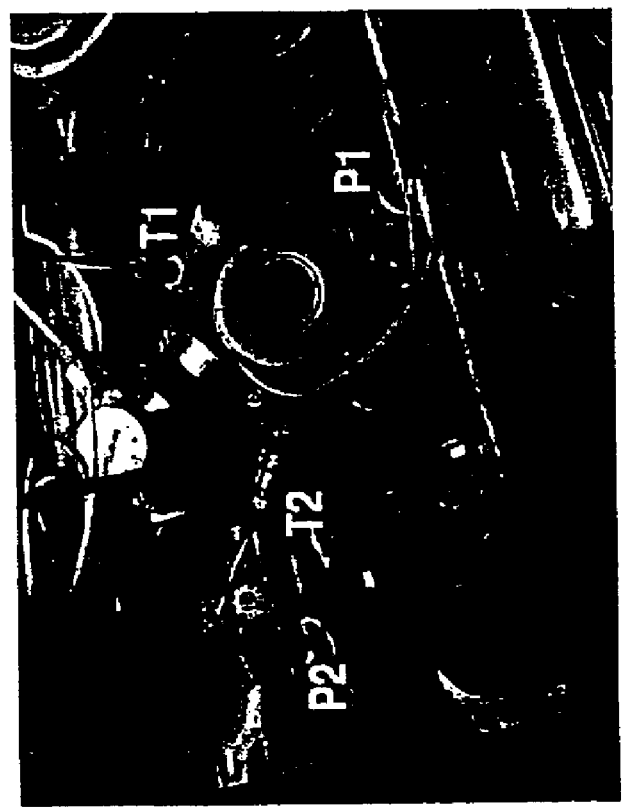
FIG. 5 is a pictorial representation of an engine with cooling system sensors.

FIG. 5 shows a Chevrolet (trademark) V8 engine with sensors. The fan is on the bottom left, the carburetor on the top right (the air cleaner has been removed). The measured variables are depicted in FIG. 5 where {T1, T2, P1, P2} corresponds to the vertices {e47,e30,s17,e6} in the TCG in FIG. 4, respectively.

As an illustrative example, one may consider a scenario where the engine system is ran to a steady state operation (or close to that), after which a punctured hose fault is introduced. To simulate a punctured hose, a T-split coupling in the lower radiator hose was utilized that allows a fault to be introduced to drain coolant from the system by attaching a valve to the open end of the coupling. The coupling has a large inner diameter to enable a large outflow. A large hose puncture is simulated by a lever operated gate valve attached to the coupling. This valve can be switched from closed to open very quickly to make the fault look abrupt. All of the coolant is not drained from the engine during the experiment to prevent damage. The valve is closed after a large quantity of coolant is drained.

FIG. 6 shows a signature generation for the engine model and the prediction of future behavior for possible candidates. Because of the algebraic loop with negative gain between $e_3$, $f_3$, $f_6$, $f_{15}$, $e_{15}$, and $e_{16}$ (tagged with a '*' marker in FIG. 4), the predictions only contain normal values whereas all actual deviations are unknown. In the qualitative framework of TRANSCEND (Trademark), normal values are not used to discriminate between fault candidates, and therefore, the generated predictions carry no diagnostic information. In effect, this means that it cannot be distinguished between any of the hypothesized parameter deviations and a very low resolution diagnosis result is obtained. For some parameters, both an increase and decrease in fault magnitudes are hypothesized. This is because each deviating measurement is used to generate possible faults. So, $R_{tstat}^+$ is generated in response to $s_{17}^-$ and $R_{tstat}^-$ in response to $e_6^-$.

In lumped parameter models, neglecting small parameters may cause circular relations without temporal effects in the system model, as illustrated in Johannes van Dijk. On the role of bond graph causality in modelling mechatronic systems. PhD dissertation, University of Twente, CIP-Gegevens Koninklijke Bibliotheek, Den Haag, The Netherlands, 1994. ISBN 90-9006903-8. In more detail, these parameters would temporally decouple signals by introducing an integrating effect, and add to the state vector. However, if they are abstracted away, direct relations arise and because of the negative feedback between passive model components, this causes a prediction to generate conflicting behaviors. In a qualitative framework, variables with such conflicting predictions are unknown and cannot be used to refine the set of hypothesized faults.

As noted by the initial system model in Eq. (1), the time derivative operator acting on z partitions the system into a set of explicit equations. Any feedback effects pass through a temporal delay, and, therefore, affect higher order temporal behavior and do not cause conflicts. In a causal model, the right hand variables are input to compute their temporal behavior.

If the $\epsilon$ parameter is removed from the model by substituting $\epsilon=0$, algebraic couplings between variables arise that may cause conflicting predictions. This is solved by noticing that the entry point of such a set of functional relations may be compensated by the removed temporal effect, but it is not reversed.

Figure 7:
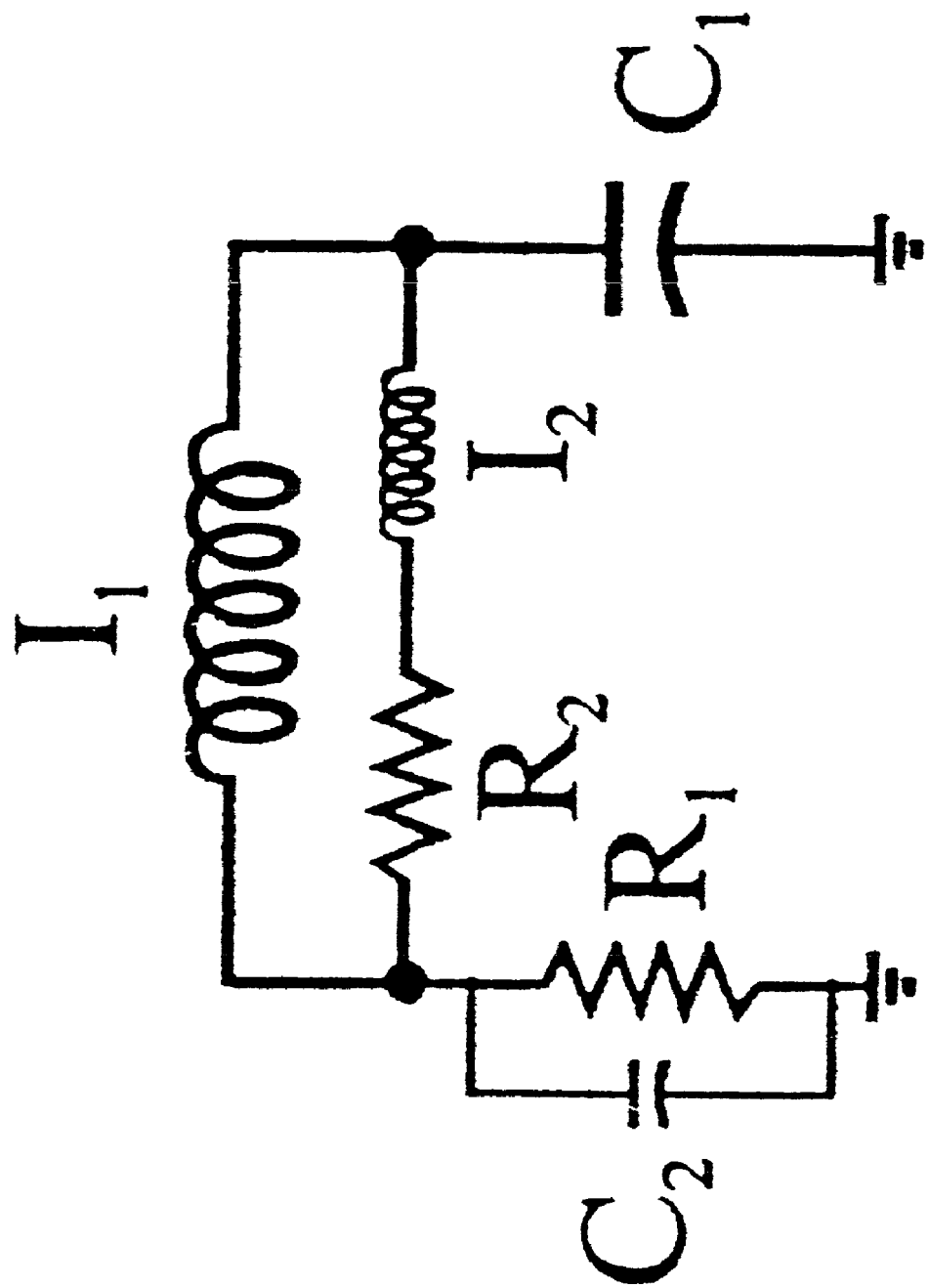
FIG. 7 is a schematic drawing of an electric circuit with parasitic effects.

FIG. 7 shows an electrical circuit with parasitic effects. To illustrate, consider its model, equation 9:

$$\begin{cases} \dot{p}_1 = \frac{1}{C_1}q_1 - \frac{1}{C_2}q_2 \\ \dot{q}_1 = \frac{1}{I_1}p_1 + \frac{1}{I_2}p_2 \\ \dot{p}_2 = \frac{1}{C_1}q_1 + \frac{1}{C_2}q_2 - \frac{R_2}{I_2}p_2 \\ \dot{q}_2 = \frac{1}{I_1}p_1 - \frac{1}{I_2}p_2 - \frac{1}{R_1C_3}q_2 \end{cases}$$

Here, $q_i$ is the charge on the capacitor $C_i$ and $p_i$ the flux of inductor $I_i$. If the parasitic parameters, $C_2$ and $I_2$, are very small with respect to the measurement system bandwidth, they result in modeled time constants that cannot be observed from measurements. For FDI purposes, they can be abstracted away. However, for this system, choosing $C_2=I_2=0$ results in a singular system of equations with $q_2=p_2=0$. First, let's transform the model in a system of equations in the regular singular perturbation form of Eq. (3).

The model shows that for $I_2=C_2=0$, $p_2=q_2=0$, and, therefore, $\dot{p}_2=\dot{q}_2=0$. To compute the reduced order system, $\dot{q}_2=\dot{p}_2=0$ can be substituted in the original model in Eq (9) and $C_2$ and $I_2$ eliminated by using the algebraic variables $$z_1 = \frac{p_2}{I_2}$$

and $$z_2 = \frac{q_2}{C_2}$$

Figure 8:
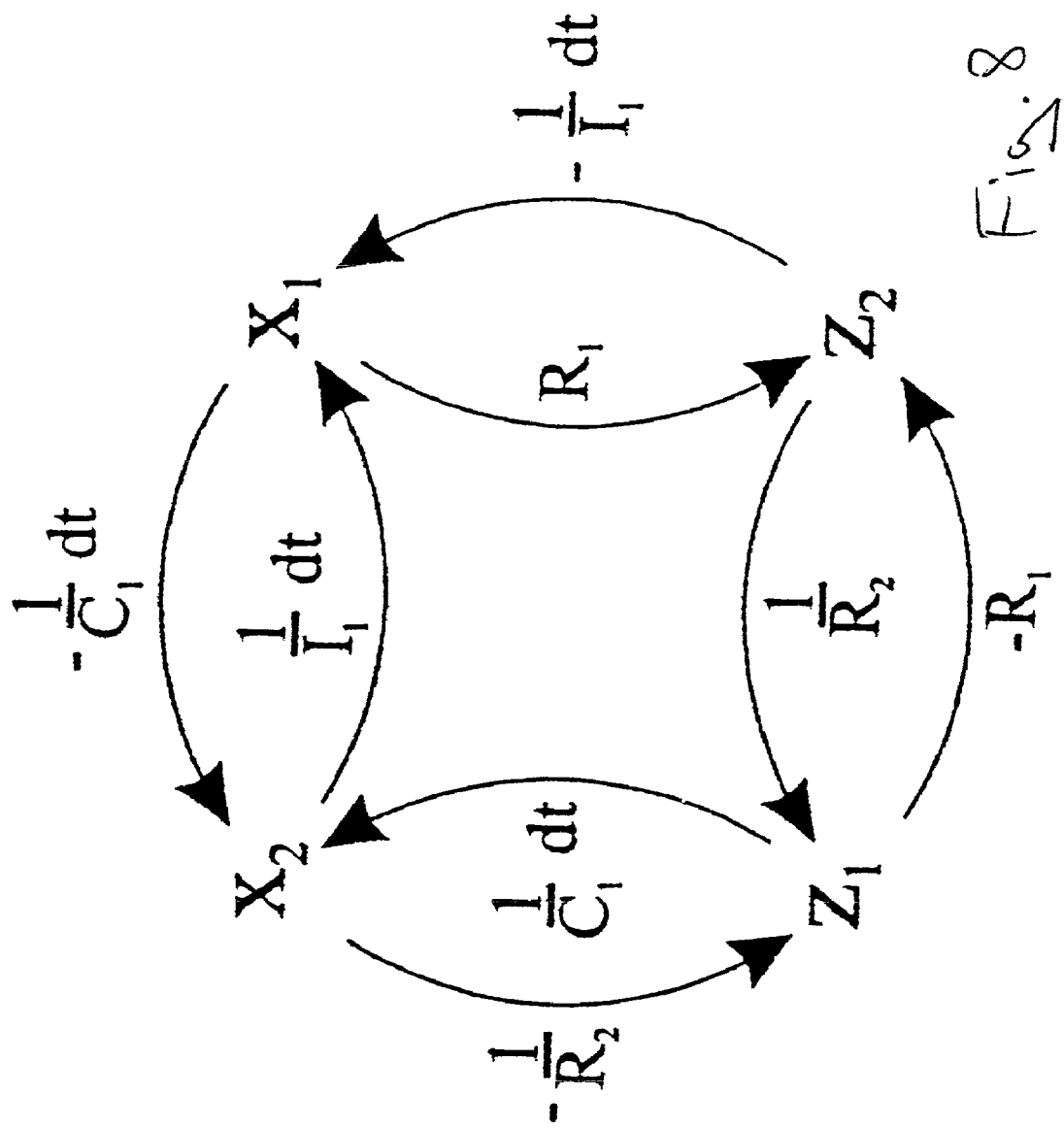
FIG. 8 is a temporal causal graph representation of equation 10.

Along with $$\chi_1 = \frac{P_1}{I_1}$$

and $$\chi_2 = \frac{q_1}{C_1},$$

this gives the following system of equations in the form of Eq.(3), equation 10:

$$\begin{cases} \dot{\chi}_1 = \frac{1}{I_1}\chi_2 - \frac{1}{I_1}z_2 \\ \dot{\chi}_2 = -\frac{1}{C_1}\chi_1 + \frac{1}{C_1}z_1 \\ 0 = -z_1 - \frac{1}{R_2}\chi_2 + \frac{1}{R_2}z_2 \\ 0 = -z_2 + R_1\chi_1 - R_1z_1 \end{cases}$$

with a FIG. 8 showing the Temporal causal graph representation of Eq. (10).

Figure 9:
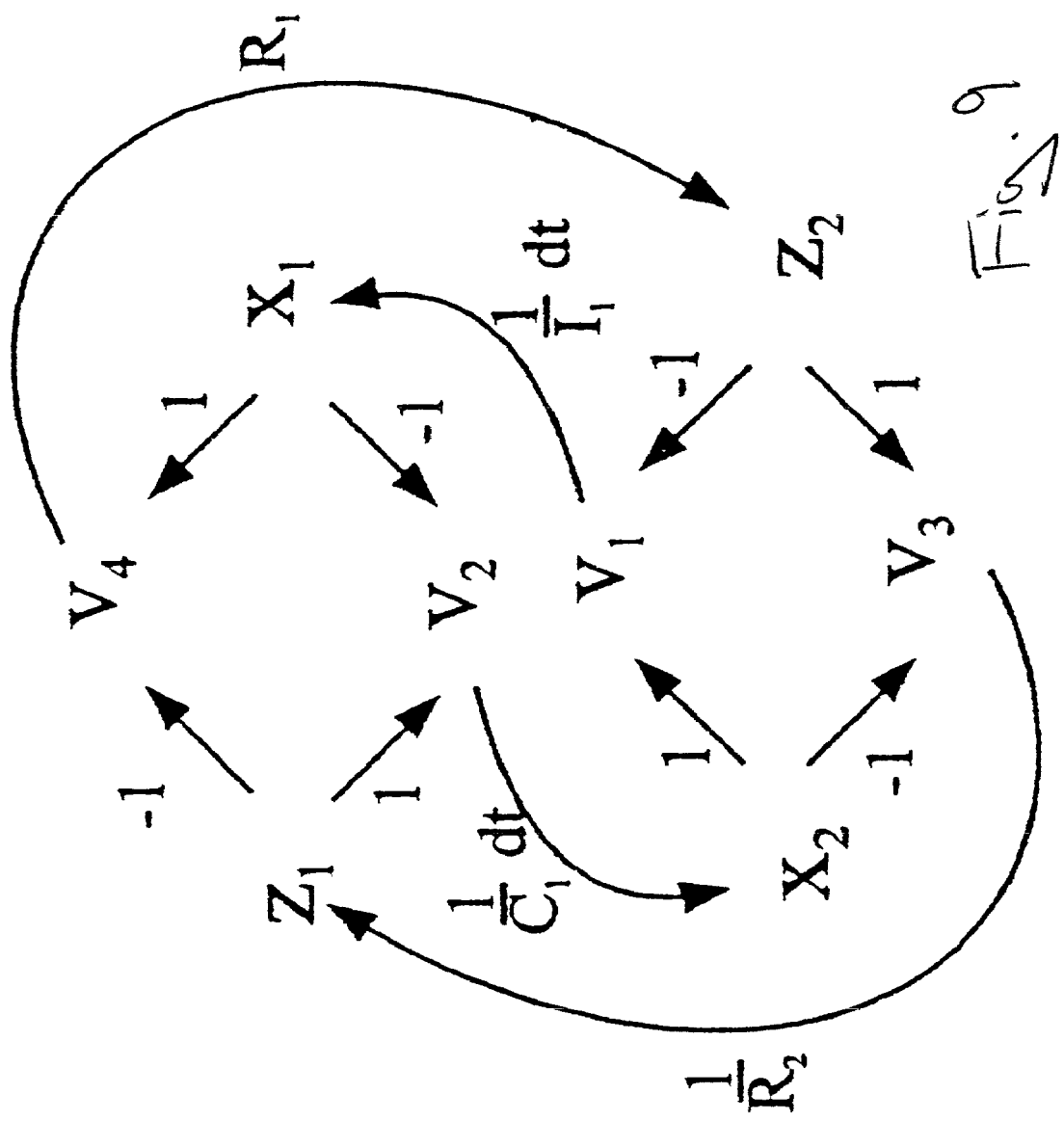
FIG. 9 is a temporal causal graph representation of equation 11.

Because one system parameter occurs on multiple edges, this graph may generate inconsistent predictions. For example, $R_1^+$ predicts $z_2^+$ and $z_2^-$. To prevent these inconsistencies, first the system of equations has to be transformed into a canonical form where each parameter occurs only once. This results in, equation 11:

$$\begin{cases} \dot{\chi}_1 = \frac{1}{I_1}(\chi_2 - z_2) \\ \dot{\chi}_2 = \frac{1}{C_1}(-\chi_1 + z_1) \\ z_1 = \frac{1}{R_2}(-\chi_2 + z_2) \\ z_2 = -R_1(\chi_1 - z_1) \end{cases}$$

where the variable summations become intermediate variables $v_1$, $v_2$, $v_3$, and $v_4$ in the TCG representation of equation 11 as shown in FIG. 9. In this TCG, $R_1^+$ predicts $z_2^+$, which predicts $v_3^+$ and $z_1^+$, which predicts $v_4^-$ and $z_2^-$ a result of the algebraic loop. When the parasitic phenomena were modeled, the prediction would be $z_2^{0+-}$, i.e., the negative feed back effect would be temporally delayed, and, therefore, consistent predictions achieved.

When the small time constants are abstracted away, algebraic manipulations can solve for $z_1$ and $z_2$ to find their actual sensitivity to $R_1$ changes. This yields, equation 12:

$$\begin{cases} z_1 = \frac{1}{R_1 + R_2}(R_1\chi_1 - \chi_2) \\ z_2 = \frac{1}{R_1 + R_2}(R_2R_1\chi_1 + R_1\chi_2) \end{cases}$$

Therefore, $$\frac{dz_2}{dR_1} > 0$$

for $R_1$, $R_2 > 0$, and, consequently, $R_1^+$ should predict $z_2^+$.

This sensitivity analysis can be generalized by assuming a linear system in the canonical form with negative loop gain. The general form of a variable $z_i$ then is $z_i = f(p)z_i + g(p)x$, where x are input variables to the causal loop and p represents the unique occurrence of a system parameter. This can be written as $(1-f(p))z_i = g(p)x$ or $$zi = \frac{g(p)}{1 - f(p)}x$$

and because the loop gain, f(p), is negative, this function is monotone with respect top for p>0.

In terms of the algebraic loop prediction, this implies that an initial deviation that enters a set of algebraic equations may be compensated by a negative feedback effect, but it cannot reverse the initial deviation. So, a prediction $z_2^+$ that leads to $z_2^-$ along a negative feedback path does not reverse the initial deviation, it merely partially compensates. So, the actual deviation is still $z_2^+$, but in a quantitative sense less + than what it would have been without the negative feedback. This theorem is used to implement an algorithm that predicts deviations of variables in algebraic loops that would otherwise be unknown.

For physical systems, the system of equations of a model contains negative feedback effects that would prohibit the use of a qualitative prediction scheme. However, this compensating effect does not reverse the initial deviation as entering the system of algebraic equations. Therefore, the prediction is not unknown, but the compensating effect should be recognized as such, and not affect the initial deviation.

Figure 10:
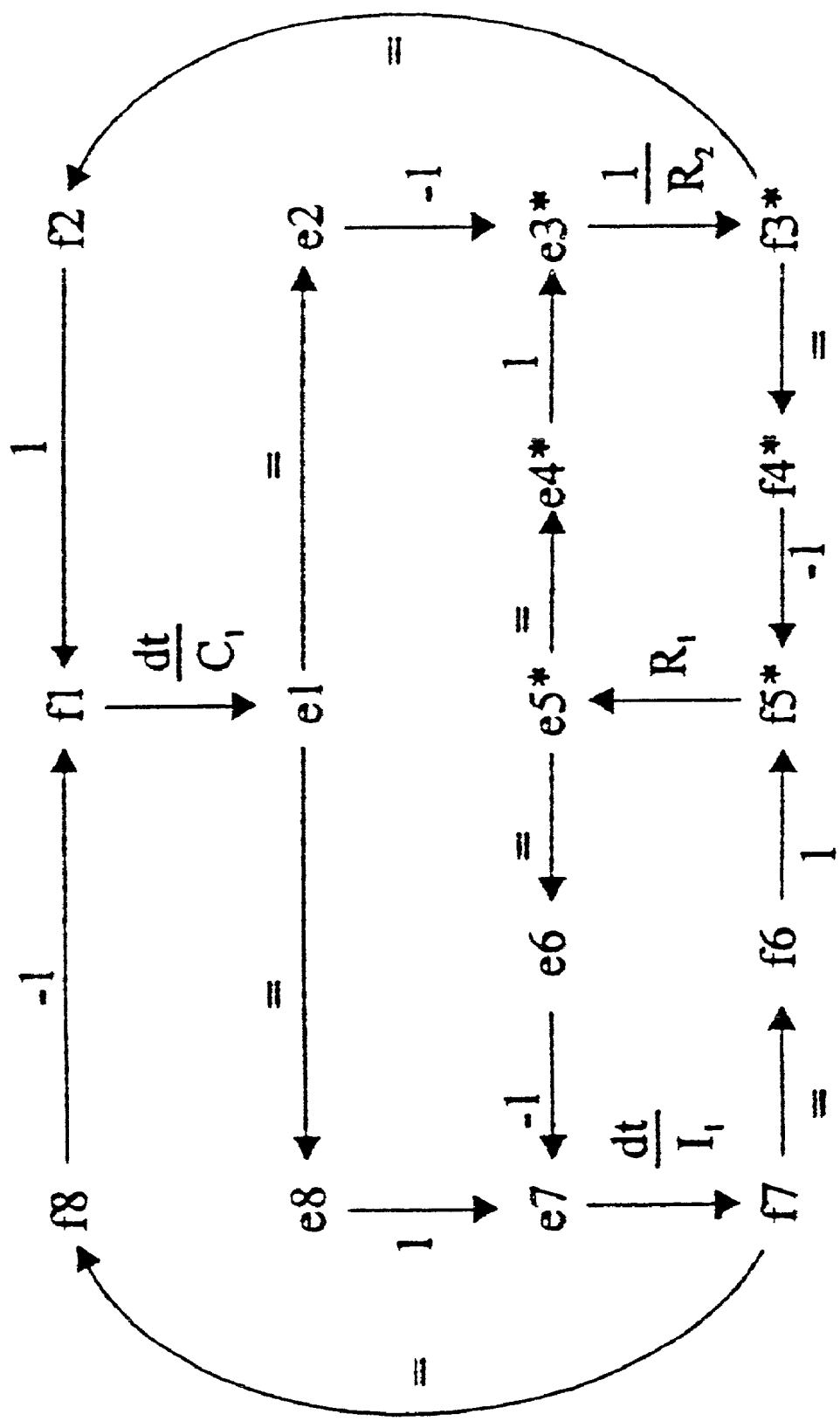
FIG. 10 is a temporal causal graph of the bond graph model for the system of FIG. 7.

The solution is illustrated with the TCG in FIG. 10 which is derived from a bond graph model of the electrical circuit in FIG. 7. In FIG. 10 vertices $e_3$, $e_4$, $e_5$, $f_3$, $f_4$, and $f_5$ are part of an algebraic loop. Note that this loop has no temporal, 'dt', edges and a negative gain. Therefore, any straightforward propagation of a qualitative deviating value eventually causes all values along the loop to become unknown, which in turn affects predicted deviations in the rest of the model.

In order to design an algorithm that implements the notion of compensating but not reversing effects, vertices that are part of an algebraic loop are tagged with a '*' marker in the TCG. In the preferred embodiment, these vertices are known from the causality assignment procedure on the bond graph model. Otherwise, the algebraic equations in Eq. (3) have to be analyzed.

The invention consists of a special treatment of the vertices in an algebraic loop in the TCG. This algorithm is based on the observation that compensating effects in an algebraic loop in the physical model affect the rate of change of a root deviation, but not its sign. Therefore, in a qualitative sense, an initial '+' deviation is still '+' if the corresponding vertex is part of an algebraic loop. The compensating '−' effect generated by the algebraic loop only decreases the '+' magnitude. Conversely, an initial '−' deviation is still '−', though not as much when a compensating '+' value is propagated along the algebraic loop. This does not mean that an algebraic loop vertex can never become unknown. In case a vertex is assigned '+' and a '−' deviation is propagated along a path other than the algebraic loop, the predicted deviation for the vertex still becomes unknown.

The algorithm must keep track of which vertex is the entry point to the algebraic loop of the initial deviation. If a deviation with opposing sign is assigned to a vertex, it is checked whether the present deviation has the same algebraic loop entry point. If so, the present deviation is kept and propagation along this branch is terminated. However, if the entry point differs, the vertex is assigned an unknown value and propagation of the unknown deviation continues. This is illustrated by analysis of a hypothesized candidate $C_1^-$ and observed variable e3 in FIG. 10. In case $C_1^-$, the deviation $e_1^+$ is propagated. Along $e_2$ it predicts a deviation $e_3^-(e_3)$, where $e_3$ in parentheses indicates this was the algebraic loop entry point for the vertex deviation. This value is propagated along the algebraic loop $f_3$, $f_4$, $f_5$, $e_5$, $e_4$, $e_3$, and because of the negative gain, predicts $e_3^+(e_3)$. This prediction conflicts with the already assigned deviation, and because both predictions have the same entry point, $e_3$, the initially assigned deviation is kept, i.e., $e_3^+(e_3)$, and propagation terminates.

It can also be seen that the algorithm must keep track of the entry point for each order of the propagated deviation. This can again be seen from FIG. 10 by analysis of a hypothesized candidate $C_1^-$ and observed variable $f_5$. Along $e_2$, $e_3$, $f_3$, and $f_4$ the deviation $C_1^-$ predicts a deviation $f_5^+(e_3)$. Along $e_8$, $e_7$, $f_7$, $f_6$ the algorithm predicts $f_5^{\uparrow}(f_5)$. Now, when the $f_5^+$ deviation is propagated along $e_5$, $e_4$, $e_3$, $f_3$, $f_2$, $f_1$, $e_1$, $e_2$, $e_3$, $f_3$, $f_4$ a deviation $f_5^{\downarrow}(e_3)$ is predicted, and so an opposing effect 15 found. In this case, because the entry points for $f_5^{\downarrow}(e_3)$ is not the same as the entry point for $f_5^{\uparrow}(f_5)$ a conflict arises and the first order derivative of $f_5$ is unknown, i.e., $f_5^+$. A comparison of the prediction algorithm with and without algebraic loop detection shows that the algebraic loop detection significantly enhances the information of the predictions through fewer unknown values. For an initial positive deviation on vertex e1, four fault candidates are hypothesized. FIG. 11 shows the signature generation for a deviation in vertex $e_1$.

Note that '.' indicates an unknown value. Also note that in TRANSCEND (Trademark) '0' predictions are not used for fault refutation, and, therefore, have less discriminative power. For three out of four hypothesized candidates, the first order prediction is known when algebraic loops are handled with the enhanced algorithm. First order predictions are unknown for all four candidates when the enhanced algorithm is not applied. Thus this provides richer information, and, therefore, more functional redundancy and higher resolution, and, thus, better fault isolation is possible.

The preferred embodiment is described in terms of graph propagation. It should be noted that this does not preclude other analysis methods such as, e.g., matrix multiplication and constraint statisfaction methods. The claims should be construed broadly to cover these other methods. Furthermore, in the preferred embodiment, the method is applied to generate qualitative predictions of system behavior in terms of magnitude deviations and higher order time derivative behavior. It should be noted that this does not preclude other analysis methods.

As underlying analysis model, a temporal causal graph of the system is used. In this graph, vertices represent variables of the system model and edges represent relations between variables. The TCG must be in its canonical form, i.e., each system model parameter is present as an edge attribute only once. The algebraic loops with negative loop gain are marked in this graph a priori by analysis of the constitutive equations or otherwise.

The predicted qualitative system behavior is exploited in fault detection and isolation of dynamic systems and implemented in the TRANSCEND (Trademark) diagnosis engine. The pseudo code algorithm for the forward propagation phase enhanced with special treatment of algebraic loop vertices is presented in Algorithm 1 at then end of this description.

Consideration may now be given to diagnosing the engine cooling system. In the TCG in FIG. 4, if a possible fault is a change in the thermostat outlet dissipation (e.g., because something gets stuck in its opening), $R_{tstat}$ deviates positively, i.e., $R_{tstat}^+$. The effect of this deviation is now propagated in the TCG to predict future behavior. Equation 13:

$$R_{tstat}^+ \to e_{13}^+ \to e_{12}^- \to f_{12}^{\downarrow} \to$$

$$f_{11}^{\downarrow} \to \begin{cases} f_{13}^{\downarrow} \to e_{13}^{\downarrow} \to e_{12}^{\uparrow} \to f_{12}^{\uparrow\uparrow} \\ f_1^{\downarrow} \to e_1^{\downarrow\downarrow} \\ \begin{cases} f_{22}^{\downarrow} \to e_{22}^{\downarrow} \to e_{11}^{\uparrow} \to e_{12}^{\downarrow} \to f_{12}^{\downarrow\downarrow} \\ f_{23}^{\downarrow} \to f_7^{\downarrow} \to e_7^{\downarrow\downarrow} \end{cases} \end{cases}$$

First, $R_{tstat}^+$ would cause the dissipative pressure to be high, $e_{13}^+$, causing the pressure across the thermostat to be low, $e_{12}^-$. The temporal, integrating, effect of $I_{tstat}$ now causes a decrease in flow through the thermostat, $f_2^{\downarrow}$ which affects three fluid paths: (i) the dissipative flow decreases, $f_{13}^{\downarrow}$, (ii) the flow out of the block decreases, $f_2^{\downarrow}$, and (iii) the flow through the upper hose decreases, $f_{11}^{\downarrow}$. Each of these branches is traced till a sufficiently high order signature is generated. In Eq. (13) the prediction is terminated when a second order derivative is reached, which results in a prediction for observed variables of order 1.

The prediction of $R_{tstat}^+$ shows a first deviation in its second order derivatives. Further predictions are generated from the TCG in FIG. 4 by tracing the $f_{12}^{\uparrow\uparrow}$ in Eq. (13) according to, equation 14:

$$f_{12}^{\uparrow\uparrow} \to f_{13}^{\uparrow\uparrow} \to e_{13}^{\downarrow\downarrow} \to e_{12}^{\downarrow\downarrow} \to \begin{cases} s_5^{\downarrow\downarrow} \to s_{17}^{\downarrow\downarrow} \\ e_0^{\downarrow\downarrow} \to e_3^{\downarrow\downarrow}(e_3) \to f_3^{\downarrow}(e_3) \to \end{cases}$$

$$\begin{cases} f_0^{\downarrow\downarrow} \to f_1^{\downarrow\downarrow} \to e_1^{\downarrow\downarrow\downarrow} \\ f_6^{\downarrow\downarrow}(e_3) \to f_{15}^{\uparrow\uparrow}(e_3) \to e_{15}^{\uparrow\uparrow} \to \begin{cases} e_6^{\uparrow\uparrow(e_3) \to e_3^{\uparrow\uparrow}(e_3) \Rightarrow X} \\ e_g^{\uparrow\uparrow} \ldots \end{cases} \\ f_{10}^{\downarrow\downarrow} \to e_{20}^{\downarrow\downarrow} \to e_{19}^{\uparrow\uparrow} \to f^{\downarrow\downarrow\downarrow}19 \end{cases}$$

This shows how the second order derivative predictions of $S_{17}$ and $e_3$ are derived. Note the feedback along the algebraic loop that is terminated when a second order prediction with opposing sign is generated for e3 that has the same entry point in the algebraic loop, viz. $e_3$.

An example of a conflict in the algebraic loop is given by $I_{rad-out}^+$, which results in the following trace (martially expanded)

$$I^+_{rad-out} \to f^-_{24} \to \begin{cases} f^-_8 \dots \\ f^-_{14} \to e^-_{14} \to e^+_{24} \to f^\uparrow_{24} \begin{cases} f^\uparrow_8 \dots \\ f^\uparrow_{14} \dots \\ f^\uparrow_9 \to f^\uparrow_{15}(f_{15}) \to e^\uparrow_{15}(f_{14}) \to \begin{cases} e^\uparrow_9 \dots \\ e^\downarrow_6(f_{15}) \Rightarrow X \end{cases} \end{cases} \\ f^-_9 \to f^-_{15}(f_{15}) \to e^-_{15}(f_{15}) \begin{cases} e^-_9 \dots \\ e^-_6(f_{15}) \to e^-_3(f_{15}) \to f^-_3(f_{15}) \to \begin{cases} f^-_6(f_{15}) \dots \\ f^-_{10} \dots \\ f^-_0 \to f^-_1 \to e^\downarrow_1 \to e^\downarrow_0 \to e^\downarrow_3(e_3) \Rightarrow X \end{cases} \end{cases} \end{cases}$$

(15)

This trace shows that the $I_{rad-out}$ deviation propagates along two different paths to predict the first order derivative of $e_3$. The top trace generates a first order effect by propagating through $R_{l-hose}$ and back into $I_{rad-out}$ to generate a first order effect that enters the algebraic loop at $f_{15}$. This predicts $e_3^\uparrow(f_{15})$. The bottom trace propagates the $f^-_{24}$ effect first through the algebraic loop and then through $C_{hy-blk}$ to generate a first order effect that enters the algebraic loop at $e_3$ and predicts $e_3^\downarrow(e_3)$. This prediction conflicts with the prediction along the other path, and, because the entry points are different, the first order prediction of $e_3$ is unknown. Note that this unknown value now is propagated further, causing a large number of first and higher order effects to become unknown (see FIG. 12).

The resulting candidates generated by the hypothesis generation algorithm and their corresponding fault signatures generated by the prediction algorithm are listed in FIG. 12 showing the candidates generated for a punctured lower hose when using the new algorithm.

The results of the new implementation are presented by diagnosing a punctured lower hose fault, $R_{leak-}$. The measured data of the two pressure sensors and temperature sensors T1 and T3 (see FIG. 5) are presented as measurements for a punctured lower hose fault ($R_{leak-}$) in FIG. 13. Since the nominal steady state values for the measured signals in our test bed are well known, we use these as the reference values for diagnostic analysis. Fault data captured by our data acquisition system is processed by a median filter to remove outliers, and the statistical discontinuity detection and slope estimation techniques are applied to process the faulty data, and convert them into a sequence of symbol value, as illustrated in Eric-Jan Manders, Gautam Biswas, Pieter J. Mosterman, Lee A. Barford, and Joel Barnett. Signal interpretation for monitoring and diagnosis, a cooling system test bed. *IEEE Transactions on Instrumentation and Measurement*, 2000. The processed signals are then analyzed by the diagnosis algorithms.

Table 1 shows the results of the signal to symbol transformation from step 4 to step 8 (the fault occurs at step 5):

TABLE 1

| Time | T1 | T3 | P1 | P2 |
|---|---|---|---|---|
| 4 | (0, .) | (0, .) | (0, .) | (0, .) |
| 5 | (0, .) | (0, .) | (0, .) | (0, .) |
| 6 | (0, .) | (0, .) | (−, ., *) | (−, ., *) |
| 7 | (+, +) | (+, +) | (−, −) | (−, +) |
| 8 | (+, +) | (+, +) | (−, −) | (+, 0) |

The slope values are marked as unknown (indicated by a '.') till an initial deviation has occurred. The tuple is extended with a '*' to indicate that an abrupt change was detected during a step. FIG. 14 shows the results generated by the hypothesis generation and refinement procedures. The nonlinearities and the algebraic loop in the engine model resulted in unknown signatures for second and higher order derivatives for all of the predicted faults, except for $R_{tstat}^+$ and $R_{tstat}^-$. Therefore, predictions were made up till the second order derivative for this model. The steps are indexed starting at 0, which is when the initial discrepancy is detected (in both P1 and P2). This is actually time step 6 in Table 1.

To illustrate, consider the prediction for $R_{l-hose}^+$ in the engine cooling system. The TCG in FIG. 4 produces the following propagation trace, equation 16:

$$R^+_{l-hose} \to e^+_{14} \to e^-_{24} \to f^\downarrow_{24} \to \begin{cases} f^\downarrow_8 \to f^\uparrow_7 \to e^{\uparrow\uparrow}_7 \\ f^\downarrow_9 \to f^\downarrow_{15}(f_{15}) \to e^\downarrow_{14}(f_{14}) \to \end{cases}$$

$$\begin{cases} e^\downarrow_9 \to e^\uparrow_{24} \to f^{\uparrow\uparrow}_{24} \\ e^\downarrow_6(f_{14}) \to e^\downarrow_3(f_{15}) \to \begin{cases} f^\downarrow_3(f_{15}) \to \begin{cases} f^\downarrow_0 \to f^\downarrow_1 \to e^{\downarrow\downarrow}_1 \\ f^\downarrow_6(f_{15}) \to f^\uparrow_{15}(f_{15}) \Rightarrow X \\ f^\downarrow_{10} \to e^\downarrow_{20} \to e^\uparrow_{19} \to f^{\uparrow\uparrow}_{19} \end{cases} \\ s^\downarrow_{16} \to s^\downarrow_{17} \end{cases} \end{cases}$$

Thus, the observed deviations are $e_6^\downarrow$ and $s_{16}^\downarrow$. This matches the predicted-deviation in FIG. 14 of the first order behavior.

The resulting candidates generated by the hypothesis generation algorithm and their corresponding fault signatures generated by the prediction algorithm are listed in the first column of FIG. 14 which corresponds to FIG. 12.

Detection of abrupt changes results in the elimination of a large number of hypothesized faults at step 1. At step 2 the $R_{hy-blk}^-$ fault is eliminated because the predicted slope is negative for measurement $e_{30}$, which does not match the observed magnitude deviation. Without abrupt change detection, $R_{l-hose}^+$ and $C_{hy-rad}^+$ cannot be eliminated at step 1 nor at any later time step and will stay in the set of hypothesized faults.

The final result at step 2 in FIG. 14 shows that the diagnosis is accurate because it includes the actual fault $R_{leak}^-$. Only one spurious candidate, $I_{rad-out}^+$, is generated and cannot be distinguished from $R_{leak}^-$ given this set of observations. In other work, as illustrated in Pieter J. Mosterman, Gautam Biswas, and Narasimhan Sriram. Measurement Selection and Diagnosability of Complex Dynamic Systems. In *Eighth International Conference on Principles of Diagnosis*, pages 79–86, Mont St. Michel, France, September 1997, and as illustrated in Sriram Narasimhan, Pieter J. Mosterman, and Gautam Biswas. A Systematic Analysis of Measurement Selection Algorithms fQr Fault Isolation in Dynamic Systems. In *Ninth International Workshop on Principles of Diagnosis*, pages 86–94, Cape Cod, Mass., May 1998, it has been shown how a systematic measurement selection algorithm can be employed to establish diagnosability of the system, i.e., which fault sets can be discriminated. Furthermore, this measurement selection algorithm can be used to generate the minimal set of required measurements for complete diagnosability, i.e., all faults can be uniquely discriminated. This analysis has not yet been performed on this system.

Thus several unique areas are noted for this invention. These include a method to break algebraic loops with negative gain in linear systems of the form $$\begin{cases} \dot{\chi} = A_d(t)\chi(t) + A_a(t)z(t) \\ z = B_d(t)\chi(t) + B_a(t)z(t) \end{cases}$$

by marking the entry point into the system of algebraic equations embodied by $B_d$ and $B_a$. This includes systems with explicit input behavior $$\begin{cases} \dot{\chi} = A_d\chi + A_a z + Cu \\ z = B_d\chi + B_a z + Du \end{cases}$$

A further improvement in the art is the use of this method to compute qualitative behavior in terms of below nominal, at nominal, or above nominal, i.e., '−', '0', '+', correspondingly. A still further improvement is the use of this method to compute higher order time derivative effects in qualitative terms. In the preferred embodiment, these qualitative terms capture the deviation in time derivative behavior from the actual system as below, at, or above this nominal level '−', '0', '+', respectively.

Another advantage is an algorithm for predicting qualitative (−, 0, +) behavior in systems with algebraic loops $$\begin{cases} \dot{\chi} = f(\chi, z, t) \\ 0 = g(\chi, z, t) \end{cases}$$

in terms of time derivatives with higher resolution than without the algebraic loop method.

Yet a further improvement is the use of this method to isolate faults in qualitative fault isolation and diagnosis of dynamic systems. To this end, in the preferred embodiment the prediction algorithm is applied in the refinement stage of the FDI engine. In TRANSCEND (Trademark), this is the stage where the algorithm predicts future behavior for hypothesized faults. This future behavior is compared with actual behavior to identify the true fault.

---

Algorithm 1 Predict future behavior for a fault

--- add initial vertex, i.e., immediate consequence of the fault to list $v_{list}$
mark vertex $0^{th}$ order derivative with qualitative value
while $v_{list}$ is not empty do
  $V_{current}$ the first vertex in $v_{list}$
  while $V_{current}$ has successors not determined to sufficient order do
    if successor relation includes a time integral effect then
      increase current derivative order
    end if
    if derivative order < maximum order and successor derivative is not conflict
then
      if successor derivative is no mark then
        successor derivative value   new_value.(current value, relation)
        if successor in algebraic loop then
          if $V_{current}$ in algebraic loop then
            add $V_{current}$.loop entry point to set of successor loop entry points
          else
            add $V_{current}$ to set successor loop entry points
          end if
        end if
      else if successor derivative value is opposite of current value then
        if relation is inverse then
          if successor in algebraic loop then
            if current loop entry point not in set of successor loop entry points then
              if $V_{current}$ is algebraic loop then
                add current loop entry point to set of successor loop entry points
              else
                add $V_{current}$ to set of successor loop entry points
              end if
            end if
          else
            if successor in algebraic loop then
              if current loop entry point not in set of successor loop entry points then
                successor derivative value   conflict
              end if
            else
              successor derivative value   conflict
            end if
          end if
        else
          if relation is inverse then
            if successor in algebraic loop then
              if current loop entry point not in set of successor loop entry points then
                successor derivative value   conflict
              end if
            else
              successor derivative value   conflict
            end if
          else
            if successor in algebraic loop then
              if current loop entry point not in set of successor loop entry points then
                if $V_{current}$ is algebraic loop then
                  add current loop entry point to set of successor loop entry
                else
                  add $V_{current}$ to set of successor loop entry points
                end if
              end if
            end if
          end if
        end if
      If attributes of successor changed then
        add the successor to the end of $v_{list}$
      end if
    end if
  end while -continued Algorithm 1 Predict future behavior for a fault

```
end while
for all vertex derivatives do
    If value = no.mark and any higher order derivative   no.mark then
        replace no.mark with normal
    end if
    if value = conflict then
        replace conflict with no.mark
    end if
end for
```

Thus, although there have been described particular embodiments of the present invention of a new and useful Qualitative Diagnosis System and Method, it is not intended that such references be construed as limitations upon the scope of this invention except as set forth in the following claims.

What is claimed is:

1. A method of detecting and isolating a fault condition in a dynamic system having physical system components, the method comprising the steps of:
   a. generating a topological model of the system;
   b. removing non-critical variables from the system model to derive a simplified reduced order model of the system;
   c. converting the simplified model into a temporal causal graph (TCG) wherein vertices in the TCG represent variables in the simplified model and temporal edges in the TCG represent relationships between the variables in the simplified model;
   d. identifying at least one negative gain algebraic loop in the TCG;
   e. tracing a path back to an entry point vertex into the at least one algebraic loop to create a marked entry point;
   f. using the algebraic loop to generate predicted deviations in system behavior caused by the fault condition;
   g. screening the predicted deviations using the marked entry point to identify valid deviations;
   h. using the valid deviations to create an enhanced predicted deviation in system output caused by the fault condition;
   i. activating the system;
   j. measuring an output from at least one physical component of the system;
   k. converting the measured output into electrical signals corresponding to measured deviations in system output; and
   detecting the fault condition by comparing the measured deviations in system output to the enhanced predicted deviation.

2. The method of claim 1 wherein the dynamic system comprises an hydraulic system.

3. The method of claim 1 wherein the dynamic system comprises a thermal system.

4. The method of claim 3 wherein the thermal system comprises an engine cooling system.

5. The method of claim 1 wherein the system comprises an electrical circuit.

6. The method of claim 1 wherein the system comprises an electromechanical system.

7. The method of claim 1 wherein steps e., f., and g. comprise:
   propagating an initial deviation through at least a portion of a plurality of vertices in the TCG to establish a predicted deviation for a successive vertex;
   associating a loop entry value with each predicted deviation after entry into the at least one algebraic loop; and
   screening the predicted deviation using the associated loop entry value.

8. The method of claim 7 further comprising keeping a successive loop entry value for each successive order encountered.

9. The method of claim 8 further comprising:
   propagating across a temporal edge to a successive order to form a successive predicted deviation;
   associating a successive loop entry value with the successive predicted deviation; and
   screening the successive predicted deviation for each successive order using the successive loop entry value.

10. The method of claim 7 wherein the step of screening the predicted deviation using the associated loop entry value comprises:
    checking a successive predicted deviation and a successive associated loop entry value for a selected vertex against a first predicted deviation and first associated loop entry value for the selected vertex to identify conflicts.

11. The method of claim 10 wherein the first predicted deviation is the initial deviation, the method further comprising:
    terminating propagation and retaining the first predicted deviation when the successive deviation has an opposing value to the initial deviation and the successive associated loop entry value matches the first associated loop entry value.

12. A method of detecting a cult condition in a physical system comprising:
    a. generating a simplified model of the physical system, the simplified model including an algebraic loop;
    b. locating an entry point into the algebraic loop to create a marked entry point;
    c. identifying ambiguities in predicted system behavior associated with the fault condition, the ambiguities caused by interactions between primary and feedback effects resulting from the algebraic loop;
    d. identifying at least one valid deviation in predicted system behavior associated with the fault condition by removing the ambiguities in the predicted system behavior, including by considering only the primary effects at the marked entry point of the algebraic loop; and
    detecting the fault condition by monitoring the system for a deviation in system output corresponding to the valid predicted deviation.

13. A method of detecting a fault condition in a dynamic physical system having physical system components comprising:
    a. measuring an output from at least one physical component of the system;
    b. converting the measured output into electrical system output signals representing the measured output;
    c. processing the signals in a processor using a fault diagnosis algorithm;
    d. wherein the fault diagnosis algorithm includes an enhanced predicted deviation in a measured output associated with the fault condition;
    e. wherein the enhanced predicted deviation is generated by
       identifying at least one algebraic loop in a simplified model of the system,
       tracing a path back to an entry point into the algebraic loop to create a marked entry point, using the algebraic loop to generate predicted deviations in the monitored signals caused by the fault condition,
screening the predicted deviations using the marked entry point to identify valid deviations, and
using the valid deviations to create the enhanced predicted deviation; and;

f. detecting deviations in the electrical system output signals; and
detecting the fault condition by comparing the detected deviations in the electrical system output signals to the enhanced predicted deviation.

* * * * *